May 27, 1924.

F. H. HOFFNER

DRINK MIXER

Filed Dec. 27, 1921

1,495,412

Inventor
Fred H. Hoffner
By Lancaster and Allwine
Attorneys

Patented May 27, 1924.

1,495,412

UNITED STATES PATENT OFFICE.

FRED H. HOFFNER, OF CLARENCE, IOWA.

DRINK MIXER.

Application filed December 27, 1921. Serial No. 525,088.

*To all whom it may concern:*

Be it known that I, FRED H. HOFFNER, a citizen of the United States, residing at Clarence, in the county of Cedar and State of Iowa, have invented certain new and useful Improvements in Drink Mixers, of which the following is a specification.

This invention relates to improvements in drink mixing receptacles.

The primary object of the invention is the provision of a drink mixing receptacle, which includes improved means for deflecting liquids or other material being mixed therein, in such manner as to secure a novel and improved mixing arrangement.

A further object of the invention is the provision of a mixing receptacle having improved deflecting means therein for determining the path which liquids being mixed therein must travel over, in order to provide an efficient mixing operation in a minimum time.

A further object of the invention is the provision of a mixing receptacle of the above described character, which is adapted for specific use with the ordinary electrical mixing machine; the mixing receptacle having improved means therein for cooperating with the mixing machine to deflect mixing liquids into the path of the agitator found upon the mixing machine.

Other objects and advantages will be apparent during the course of the following detailed description.

In the accompanying drawing, forming a part of this specification, and wherein similar reference characters designate corresponding parts throughout the several views, Figure 1 is a vertical cross sectional view taken through the improved mixing receptacle and showing the novel deflecting means mounted therein.

Figure 1:
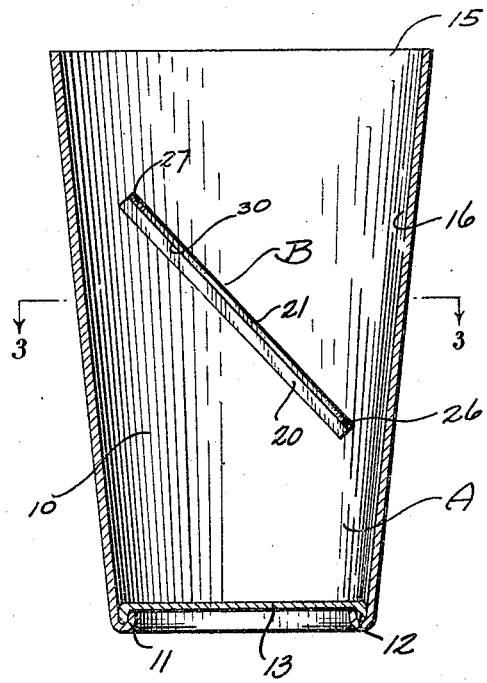
Figure 3:
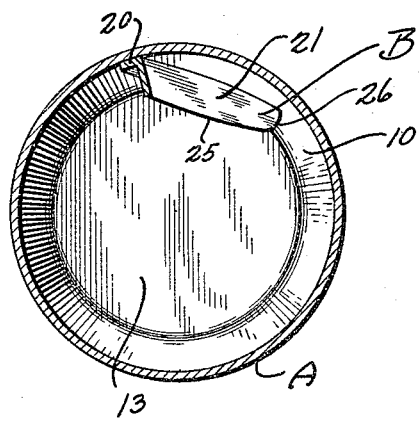
Figure 3 is a horizontal cross sectional view taken on the line 3—3 of Figure 1.
Figure 2:
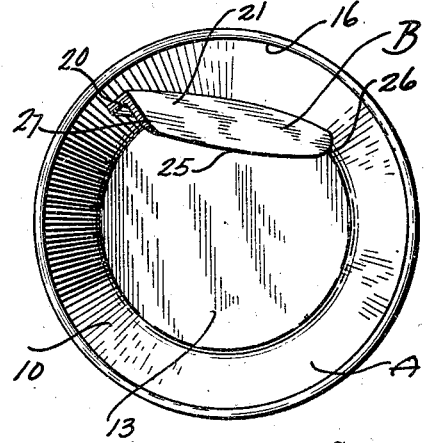
Figure 2 is a plan view of the improved mixing receptacle and showing the interior construction thereof.

In the drawing, wherein for the purpose of illustration is shown a preferred embodiment of my invention, the letter A designates the improved mixing receptacle having the deflecting means B mounted therein.

The receptacle A may of course, be of any approved construction, and in the present instance is of the upward flaring tumbler type, including the circumferential body portion 10 flanged upwardly as at 11 upon its bottom marginal edge to provide a pocket for a downturned marginal flange 12 of a bottom piece 13. The tumbler body 10 diverges upwardly in even flaring manner from the bottom member 13, and provides the opening 15 in the receptacle 10 upwardly of the body portion 10. It is preferred that the interior surface 16 of the receptacle A be of even arcuation.

The deflecting element B is of novel formation, and includes the arcuate attaching flange 20 having the deflecting flange 21 extending outwardly therefrom substantially at right angles thereto. The flange 20 is convexly arcuated longitudinally, in order to conform to the arcuation of the inside surface 16 of the article A; this arcuation being of such contour as to permit the attachment of the element B as by soldering to the surface 16, and whereby the deflecting element B will be inclined transversely of the receptacle A, and in order to position the same at a relatively acute angle to the horizontal bottom member 13. It should be noted that due to the flaring sides of the receptacle A, the deflector B will likewise be inclined longitudinally of the axis of the tumbler A. When the attaching flange 20 is mounted in rigid manner to the inside surface 16, the deflecting rib or flange 21 extends outwardly into the receptacle A and toward the center thereof. It is preferred that the outer free marginal edge 25 of the deflecting rib 21 be convexly arcuated longitudinally; the extreme ends 26 and 27 denoting the bottom and top and edges of the rib 21, are likewise arcuated upon a relatively sharp radius.

In operation, the mixing receptacle A is disposed under the agitator of the ordinary mixing machine (not shown), and when the drink or liquid is disposed in the receptacle A and the agitator set in motion, the rotation of said agitator as is well known will produce a swirling motion of the liquid being mixed. Due to rapid rotation of the ordinary mixing machine agitator, centrifugal action of the mixing liquid will cause the same to rise upon the flaring side of said mixing receptacle. However, it is preferred that the rib 25 be so disposed as to the direction of rotation of the liquid being mixed in the receptacle A, as to deflect the same downward toward the bottom member 13. It is at once obvious that such deflection of the liquid being mixed will break up centrifugal action to a certain extent, and force the liquid being mixed downwardly toward the bottom 13 and toward the central axis of the agitator.

Many of the drinks which are mixed at soda fountains and like establishments contain solid matter, such as ice cream. Due to centrifugal action and the buoyancy of the solid substance, the same tends to rise to the surface of the mixing drink or liquid, and it requires considerable time in order to thoroughly dissolve the same in the drink. However, it is apparent that as the ice cream or other solid rotates with the liquid being mixed, the same will come into direct contact with the outwardly extending deflecting rib 25, and due to the inclined position of the same transversely of the receptacle A, the solid will contact the under surface 30 of the rib 25, and ride downwardly thereof to be disposed directly adjacent the head of the agitator (not shown). Thus, the ingredients of the drink may be regulated to be disposed directly in the path of the agitator. Such cooperation of the improved mixing receptacle with an agitating machine will effectively prepare a mixture in a minimum of the time required for mixing in an ordinary internally smooth container. It is apparent that such a result is of considerable importance, since it is expedient to have drinks mixed in as quick time as possible at soda fountains and establishments of like nature, since the same are susceptible to "rush periods", and the number of mixing machines in any establishment is of course limited.

Various changes in the shape, size and arrangement of parts of the improved drink mixer can, of course, be made to the improved form herein shown and described, without departing from the spirit of the invention or the scope of the claims.

I claim:

1. As an article of manufacture, a mixing receptacle of upwardly flaring tumbler type, having a substantially L-shaped deflecting rib mounted therein, said rib including an attaching flange arcuated longitudinally for attachment to the interior surface of said receptacle, and an outwardly extending deflecting rib flange connected substantially at right angles to said attaching flange, said deflecting rib flange being arcuated longitudinally upon its outer marginal edge and arcuated upon its end marginal edges, said deflecting member being so positioned interiorly of the mixing receptacle as to incline at an acute angle transversely thereof whereby mixing liquids in said receptacle will be deflected by said deflecting rib toward the bottom of said receptacle.

2. As an article of manufacture a mixing receptacle having an annular wall flaring upwardly, and a deflecting strip secured against the inner surface of the annular wall and diagonally disposed and terminating in spaced relation to the upper and lower ends of the wall, said strip having a portion in the form of an elongated flat plate extending from the wall of the receptacle and having its free longitudinal edge curved outwardly.

FRED H. HOFFNER.